United States Patent
Kim et al.

(10) Patent No.: US 6,330,104 B1
(45) Date of Patent: Dec. 11, 2001

(54) OPTICAL WAVELENGTH CONVERSION USING FOUR WAVE MIXING IN FIBER

(75) Inventors: Kwang S. Kim, Red Bank; Liyan Zhang, Middletown, both of NJ (US)

(73) Assignee: Lucent Technologies, Inc, Murray Hill, NJ (US)

( * ) Notice: Subject to any disclaimer, the term of this patent is extended or adjusted under 35 U.S.C. 154(b) by 0 days.

(21) Appl. No.: 09/371,989

(22) Filed: Aug. 11, 1999

(51) Int. Cl.[7] ................................................... G02F 1/365
(52) U.S. Cl. ............................ 359/332; 359/327; 359/330
(58) Field of Search ......................................... 359/326–332

(56) References Cited

U.S. PATENT DOCUMENTS 5,386,314 * 1/1995 Jopson ................................... 359/326
5,532,868 * 7/1996 Gnauck et al. ........................ 359/332
5,754,334 * 5/1998 Artiglia et al. ........................ 359/332
6,101,024 * 8/2000 Islam et al. ........................ 359/327 X

OTHER PUBLICATIONS

"Wavelength Conversion Technologies for WDM Network Applications" by S.J. B. Yoo, Journal of Lightwave Technology, vol. 14, No. 6, Jun. 1, 1996, pp. 955–966.

* cited by examiner

Primary Examiner—John D. Lee
(74) Attorney, Agent, or Firm—John A. Caccuro

(57) ABSTRACT

A wavelength conversion apparatus and method uses four wave mixing of a first wavelength and a control wavelength in an optical fiber to convert the first wavelength to a desired wavelength. Four wave mixing is produced by operating the optical fiber at a predetermined input power density and by using a fiber length which provides substantial Raman gain. The first wavelength is converted to a higher wavelength by using the higher wavelength four wave mixing signal and converted to a lower wavelength by using the lower wavelength four wave mixing signal.

12 Claims, 5 Drawing Sheets

OPTICAL WAVELENGTH CONVERSION USING FOUR WAVE MIXING IN FIBER

TECHNICAL FIELD OF THE INVENTION

This invention relates to an optical wavelength conversion and, more particularly, to a method of and apparatus for providing optical wavelength conversion using four wave mixing in fiber.

BACKGROUND OF THE INVENTION

Increasingly, communication networks are using optical fiber links to interconnect switches, routers and multiplexer nodes of the networks. On each optical fiber link, Wavelength Division Multiplexing(WDM) is being used to increase bandwidth utilization of the optical fiber link. When a network includes many nodes, the blocking probability increases due to wavelength contention which occurs when two channels require the use of the same wavelength. This wavelength contention problem is often overcome by using wavelength conversion whereby one of the channels is converted to another unused wavelength. Wavelength conversion for WDM networks is described in the article entitled "Wavelength Conversion Technologies for WDM Network Applications" by S. J. B. Yoo, Journal of Lightwave Technology, Vol. 14, No. 6, Jun. 1, 1996.

One technique uses four wave mixing effects of a semiconductor optical amplifier to accomplish wavelength conversion. However, many of the existing wavelength conversion techniques require expensive components and/or are complicated to implement. Thus, there is a continuing need for a simple, low cost wavelength conversion apparatus.

SUMMARY OF THE INVENTION

In accordance with the present invention, we disclose a wavelength conversion apparatus and method which uses four wave mixing of a first wavelength and a control wavelength in an optical fiber to convert the first wavelength to a desired wavelength. Four wave mixing is produced by operating the optical fiber at a predetermined input power density and by using a fiber length which provides substantial Raman gain. The first wavelength is converted to a higher wavelength by using the higher wavelength four wave mixing signal and converted to a lower wavelength by using the lower wavelength four wave mixing signal.

More particularly, in accordance with our invention, an optical wavelength converter apparatus comprises (1) a first input optical wavelength signal coupled to a first end of an optical fiber; (2) a second input optical wavelength signal coupled to the first end of the optical fiber; (3) the optical fiber having a length suitable to provide substantial Raman gain to optical wavelength signals produced by four wave mixing of the first input optical wavelength signal and the second input optical wavelength signal in the optical fiber, the Raman gain using at least one pump signal selected from a group including the first input optical wavelength signal, the second input optical wavelength signal, and a third input optical wavelength signal having a wavelength substantially below the four wave mixing optical wavelength signals produced in the optical fiber; (4) wherein the power levels of the first and second optical wavelengths are selected to produce a predetermined power density in the optical fiber; and (5) an optical filter connected to a second end of the optical fiber for filtering all optical wavelengths except for one of the four wave mixing optical wavelength signals.

In accordance with our invention, when the first wavelength is to be increased, the higher wavelength of the four wave mixing optical wavelength signals is used and no third input wavelength is used as a pump signal to provide Raman gain. When the first wavelength is to be decreased, the lower wavelength of the four wave mixing optical wavelength signals is outputted from the filter and the third input wavelength is used as a pump signal to provide Raman gain.

According to another aspect of our invention, the optical fiber is erbium doped at a level which enables the optical fiber to be an erbium doped fiber amplifier (EDFA), using a suitable pump wavelength (e.g., 1480 nm). One embodiment includes an adjustable polarization controller for controlling the polarization of one of the first and second input optical wavelengths being coupled to the optical fiber. Other embodiments provide different techniques for coupling the first and second input optical wavelengths to the optical fiber by splicing, tapered splicing, or by using a graded-index (GRIN) lens. Other embodiments enable the optical fiber to be a polarization maintaining optical fiber, a single mode fiber, or a multimode fiber.

Our method of converting an optical wavelength to another wavelength comprises the steps of (1) receiving a first input optical wavelength to be converted; (2) receiving a second input optical wavelength; (3) coupling the first and second input optical wavelengths to a first end of an optical fiber; (4) selecting the optical fiber to have a length suitable to provide substantial Raman gain optical wavelength signals produced by four wave mixing of the first input optical wavelength signal and the second input optical wavelength signal in the optical fiber; (5) pumping the Raman gain using at least one pump signal selected from a group including the first input optical wavelength signal, the second input optical wavelength signal, and a third input optical wavelength signal having a wavelength substantially below the four wave mixing optical wavelength signals produced in the optical fiber; (6) selecting the power level of the first and second input optical wavelengths to produce a predetermined power density in the optical fiber; and (7) filtering all optical wavelengths exiting from the second end of the optical fiber except for one of the four wave mixing optical wavelength signals.

BRIEF DESCRIPTION OF THE DRAWINGS

In the drawings.

In the following description, identical element designations in different figures represent identical elements. Additionally in the element designations, the first digit refers to the figure in which that element is first located (e.g., 102 is first located in FIG. 1).

DETAILED DESCRIPTION

Figure 1:
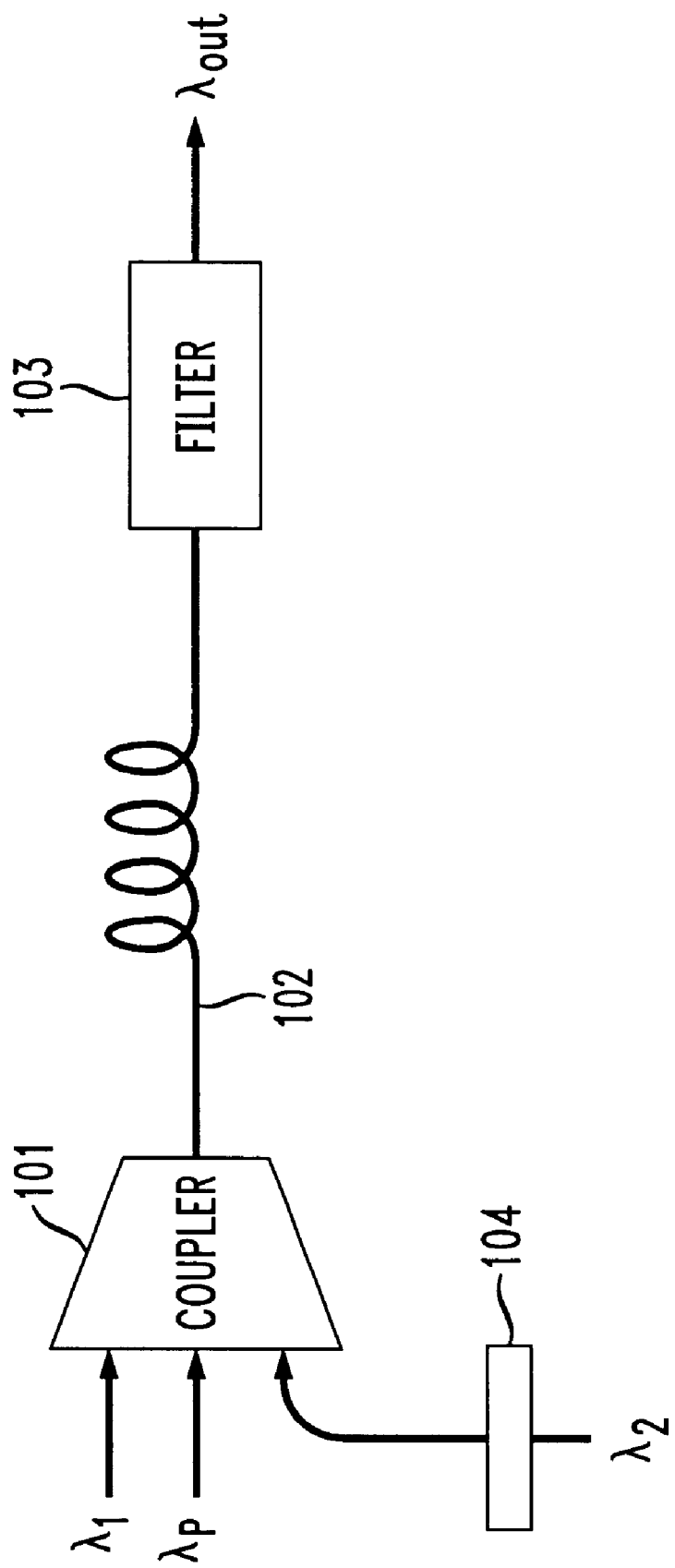
FIG. 1 shows, in accordance with the present invention, an illustrative block diagram of our optical wavelength converter apparatus including an optical fiber for providing optical wavelength conversion using four wave mixing.

Shown in FIG. 1 is an illustrative block diagram of our optical wavelength converter apparatus for providing optical wavelength conversion using four wave mixing in fiber. As shown, our optical wavelength converter apparatus includes a coupler 101 a length of optical fiber 102, and a filter 103. The coupler 101 receives the input optical wavelengths $\lambda 1$ and $\lambda 2$ and couples these optical signals to one end of optical fiber 102. For the purposes of the present discussion, we assume that the optical wavelength $\lambda 1$ is the signal wavelength to be converted and optical wavelength $\lambda 2$ is a control wavelength used to produce the desired output wavelength $\lambda$out. Typically, $\lambda 1$ would be one of a plurality of wavelength division multiplexed (WDM) wavelengths used for communications by a WDM system.

In accordance with our invention, we produce four wave mixing in optical fiber 102 and use it to generate the desired output wavelength $\lambda$out. We have recognized that if the input signal (wavelengths $\lambda 1$ and $\lambda 2$) power density is increased and the length of optical fiber 102 is increased, four wave mixing of the wavelengths $\lambda 1$ and $\lambda 2$ is drastically enhanced. Moreover, the increased length of optical fiber 102 produces Raman gain, thereby further enhancing the level of the four wave mixing signals. Additionally, by adding a small amount of erbium doping to the optical fiber 102, the optical fiber 102 forms an erbium doped fiber amplifier (EDFA) which further increases the four wave mixing signals. An adjustable polarization device 104 may also be used to optimized four wave mixing in the optical fiber 102.

Generating Longer Wavelengths

FIG. 2 (a) shows, illustratively, the optical wavelength $\lambda 1$ (in bold) to be converted to a shorter wavelength $\lambda$out (in bold) having a wavelength equal to $\lambda 1 - \Delta\lambda$. With reference to FIG. 2 (b) there is shown the output optical wavelengths $\lambda 1, \lambda 2, 2\lambda 1 - \lambda 2$, and $2\lambda 1 - \lambda 2$ which result when optical wavelengths $\lambda 1$ and $\lambda 2$ undergo four wave mixing in optical fiber 102. In FIG. 2(b) the optical wavelength $\lambda 1$ to be converted has a longer wavelength than the control wavelength $\lambda 2$. The desired out wavelength $\lambda$out would be the longer four wave mixing wavelength $2\lambda 2 - \lambda 1$. As shown in FIG. 2(b), the difference in wavelength between the signal wavelength $\lambda 1$ to be converted and the desired output wavelength $\lambda$out, i.e., $2\lambda 2\lambda 1$, is determined by selecting the control wavelength $\lambda 2$ inputted to fiber 102.

Figure 2A:
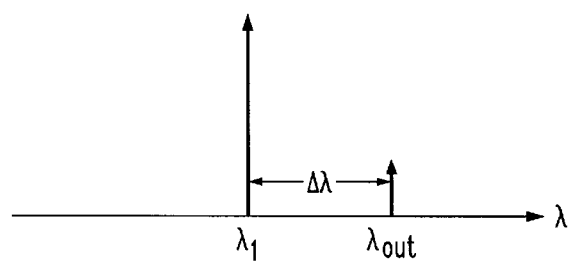
FIG. 2 shows, illustratively, (a) the optical wavelength $\lambda 1$ to be converted to a longer wavelength $\lambda$out, (b) and (c) two ways to use four wave mixing for the conversion, (d) the effect of Raman gain on the optical signals of (c), and (e) the effect of erbium gain on the signals of (d)
Figure 2B:
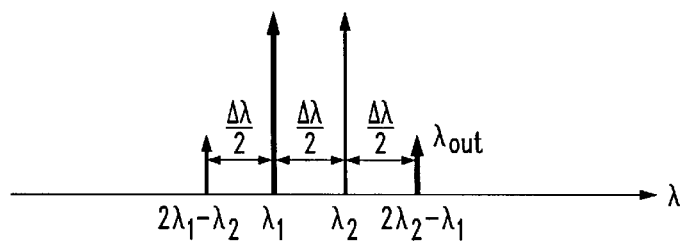
Figure 2C:
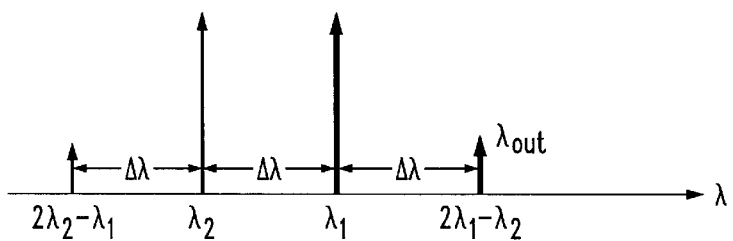

In the FIG. 2(c) example, the optical wavelength $\lambda 1$ to be converted has a longer wavelength than the control wavelength $\lambda 2$. The desired out wavelength $\lambda$out would be the longer four wave mixing wavelength $2\lambda 1 - \lambda 2$. As shown in FIG. 2(c), the difference between the signal wavelength $\lambda 1$ and the control wavelength $\lambda 2$ is equal to the wavelength shift $\Delta\lambda$ needed to produce the output wavelength $\lambda$out ($2\lambda 1 - \lambda 2$). In comparison as shown in FIG. 2(b), when $\lambda 2 > \lambda 1$, the difference between the signal wavelength $\lambda 1$ and the control wavelength $\lambda 2$ is only one half of the wavelength shift $\Delta\lambda/2$ needed to produce the output wavelength $\lambda$out ($2\lambda 2 - \lambda 1$).

As will be discussed in a later paragraph, in FIG. 2(b) the smaller separation $\Delta\lambda/2$ between the signal wavelength $\lambda 1$ and the control wavelength $\lambda 2$ has the advantage of being less sensitive to the dispersion characteristics of the optical fiber 102. However, the smaller separation $\Delta\lambda/2$ requires a sharper filter 103 to separate $\lambda$out (i.e., $2\lambda 2 - \lambda 1$) from $\lambda 2$. In comparison in FIG. 2(c), a larger separation $\Delta\lambda$ between the signal wavelength $\lambda 1$ and the control wavelength $\lambda 2$ has the disadvantage of being more sensitive to the dispersion characteristics of the optical fiber 102, but relaxes the filter 103 requirements needed to separate $\lambda$out (i.e., $2\lambda 1 - \lambda 2$) from $\lambda 1$. Additionally in FIG. 2(b), a given change in control wavelength $\lambda 2$ produces twice as large a change in the output wavelength $\lambda$out than does the arrangement of FIG. 2(c).

As noted above, the two additional optical wavelengths $2\lambda 1 - \lambda 2$ and $2\lambda 2 - \lambda 1$ are formed as a result of four wave mixing of wavelengths $\lambda 1$ and $\lambda 2$ that occurs in optical fiber 102. Four wave mixing results from passing two wavelengths $\lambda 1$ and $\lambda 2$ through a third-order nonlinear medium, e.g., optical fiber 102. Typically in transmission fiber, the four wave mixing that occurs in an optical fiber 102 is very small and considered undesirable and attempts are made to minimize it. In accordance with the present invention, we have recognized that the four wave mixing optical wavelengths $2\lambda 1 - \lambda 2$ and $2\lambda 2 - \lambda 1$ can be utilized to provide wavelength shifting of the signal wavelength $\lambda 1$ to produce the desired output wavelength $\lambda$out. Thus, the technique used in our optical wavelength converter is to select the length of optical fiber 102, its diameter, and its input wavelength power level in a manner which optimizes four wave mixing and which also produces Raman gain to the resulting four wave mixing signals ($2\lambda 1 - \lambda 2$ and $2\lambda 2 - \lambda 1$).

It can be shown that the output signal power level of the four wave mixing wavelength $P_{2\lambda 1 - \lambda 2}$ from an optical fiber 102 varies approximately as $$P_{2\lambda 1 - \lambda 2} \propto \left(\frac{Leff}{Aeff}\right)^2 \times P_{\lambda 1}^2 \times P_{\lambda 2} \tag{1}$$

Where $P\lambda 1$ is the input signal power of the wavelength $\lambda 1$ to be converted, $P\lambda 2$ is the input signal power of the control wavelength $\lambda 2$ and $\lambda 2 > \lambda 1$. For convenience, the term $P^2_{\lambda 1} \times P_{\lambda 2}$ is hereinafter referred to as the input power Pin.

The term Leff is the effective length of the optical fiber 102 and can be shown to be $$Leff = 1/\alpha(1 - e^{-\alpha L}) \tag{2}$$

where $\alpha$ is the attenuation coefficient of the fiber 102 and L is the actual length of fiber 102.

The term Aeff is the effective cross-section area of the optical fiber 102 and is approximately $$Aeff = \pi(MFD/2)^2 - 3 \tag{3}$$

where MFD is the mode field diameter of the fiber 102 expressed in microns ($\mu$m)

Thus, in accordance with equation (1), the power level of the four wave mixing optical wavelengths $2\lambda 1 - \lambda 2$ and $2\lambda 2 - \lambda 1$ increases by increasing the effective length Leff of the fiber 102, by decreasing the effective area Aeff of the fiber 102, and by increasing the input power Pin of wavelengths $\lambda 1$ and $\lambda 2$. Moreover, the change in the power of the four wave mixing optical wavelengths $2\lambda 1 - \lambda 2$ and $2\lambda 2 - \lambda 1$ varies as the square of the increase in the length L, decrease in diameter MFD, and increase in input power Pin. The ratio of Pin/Aeff is the power density of the input wavelengths $\lambda 1$ and $\lambda 2$ applied to optical fiber 102.

From equation (1) increasing the length of optical fiber 102 from about 100 meters (a length typically used for an EDFA) to 1000 meters significantly increases the Raman gain and hence the power level of the four wave mixing wavelengths $2\lambda 1 - \lambda 2$ and $2\lambda 2 - \lambda 1$ by a factor of 100. Additionally for example, by increasing the power density Pin/Aeff by a factor of 5 would produce a further increase the power level of the four wave mixing wavelengths $2\lambda 1-\lambda 2$ and $2\lambda 2-\lambda 1$ by a factor of 25. Thus for our example, the combined increase in the power level of the four wave mixing wavelengths $2\lambda 1-\lambda 2$ and $2\lambda 2-\lambda 1$ would increase by a factor of 2500. As noted, the resulting Raman gain of optical fiber 102 can be used to amplify the four wave mixing wavelengths $2\lambda 1-\lambda 2$ and $2\lambda 2-\lambda 1$. In this manner, our optical converter apparatus uses the optical fiber 102 to generate the four wave mixing wavelengths $2\lambda 1-\lambda 2$ and $2\lambda 2-\lambda 1$ and uses the filter 103 to separate the desired wavelength Bout (i.e., either $2\lambda 1-\lambda 2$ or $2\lambda 2-\lambda 1$) from the other signals present at the output of optical fiber 102.

Additionally, since four wave mixing is a result of the interaction between the input wavelengths $\lambda 1$ and $\lambda 2$ and, as shown in equation (1), it is dependent on the peak power level Pin of these wavelengths. Since the dispersion of the wavelengths $\lambda 1$ and $\lambda 2$ in optical fiber 102 would affect the peak power of the interacting wavelengths $\lambda 1$ and $\lambda 2$, to increase four wave mixing it is necessary to minimize the dispersion in the fiber 102. Moreover, because the dispersion should be minimized for each wavelength $\lambda 1$ and $)\lambda 2$, the fiber 102 should ideally be selected to have the lowest amount of dispersion and to have minimal dispersion slope with wavelength in the wavelength region of $\lambda 1$ and $\lambda 2$. Having a minimal dispersion slope ensures that different control wavelengths $\lambda 2$ would produce similar peak power levels and four wave mixing signal levels that do not vary much with changes in control wavelengths $\lambda 2$.

Additionally, four wave mixing in optical fiber 102 can be further increased by adjusting polarization controller 104 to a value where the four wave mixing is optimized. Further increase in four wave mixing can be obtained by using an optical fiber 102 which is a polarization maintaining fiber. In this manner, the improvement in four wave mixing from adjusting the polarization controller 104 will be maintained over the length of optical fiber 102.

Figure 4A:
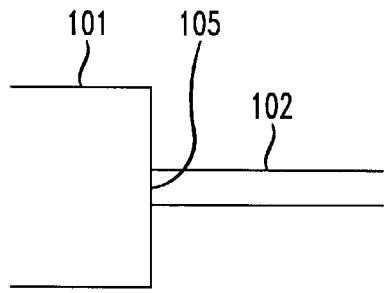
FIGS. 4(a)–(c) show three types of coupler interfaces to the optical fiber.
Figure 4B:
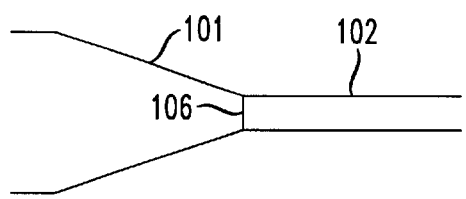
Figure 4C:
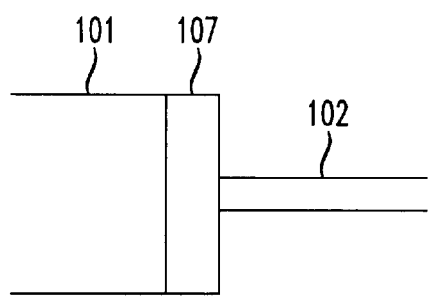

One illustrative practical optical wavelength converter apparatus would include an optical fiber 102 which is at least 400 meters long and have a diameter of approximately 4 $\mu$m or less, so that a critical level of power density can be reached with lower levels of input signal power. Since the diameter of optical fiber 102 may be much smaller than the output of coupler 101 care must be taken to ensure that signals are properly coupled to fiber 102. With reference to FIG. 4, the interface 401 between the fiber 102 and the coupler 101 can take different forms. In FIG. 4(a), the coupler 101 is spliced to optical fiber 102. In FIG. 4(b), a tapered splice is used. In FIG. 4(c), a graded-index (GRIN) lens is used to couple optical signals to optical fiber 102.

Returning to FIG. 2(c), Illustratively, it is assumed that optical wavelength $\lambda 1$ is a longer wavelength than optical wavelength $\lambda 2$. Even though the diameter and length of optical fiber 102 is selected to increase four wave mixing, additional gain is typically needed to boost the level of the desired output $\lambda$out (i.e., $2\lambda 1-\lambda 2$ in our example). In accordance with the present invention, the desired four wave mixing component $2\lambda 1-\lambda 2$, used as $\lambda$out, is enhanced using Raman gain in the optical fiber 102.

Figure 2D:
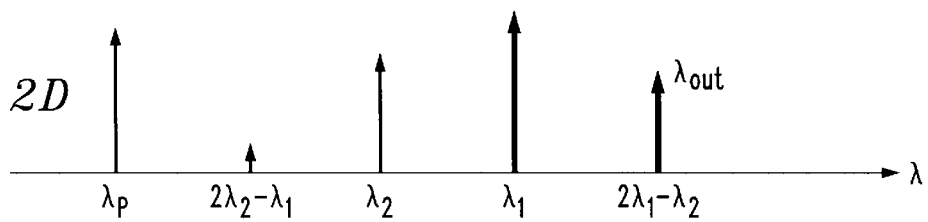

In Raman gain, the coupling of light at a higher-frequency vibrational mode of the medium, e.g., optical fiber 102, acts as an energy source to provide gain to any lower frequency optical signal, i.e., longer wavelength signal. Thus, any shorter wavelength optical signal (e.g., $\lambda 2$ and $\lambda 1$) coupled to the optical fiber 102 acts like an energy source or pump to provide gain to the longer wavelengths (e.g., $2\lambda 1-\lambda 2$). This Raman gain is shown in FIG. 2(d). Comparing FIG. 2(d) to FIG. 2(c), the Raman gain has illustratively increased the amplitude of the optical signal $2\lambda 1-\lambda 2$ relative to, and at the expense of, the attenuated shorter wavelengths $2\lambda 1-\lambda 1$, $\lambda 1$, and $\lambda 2$. As shown, if the power level of wavelengths $\lambda 1$ and $\lambda 2$ are equal in FIG. 2(c), then in FIG. 2(d) the power level of wavelength $\lambda 2$ would be then be smaller than the power level of wavelength $\lambda 1$.

Figure 5:
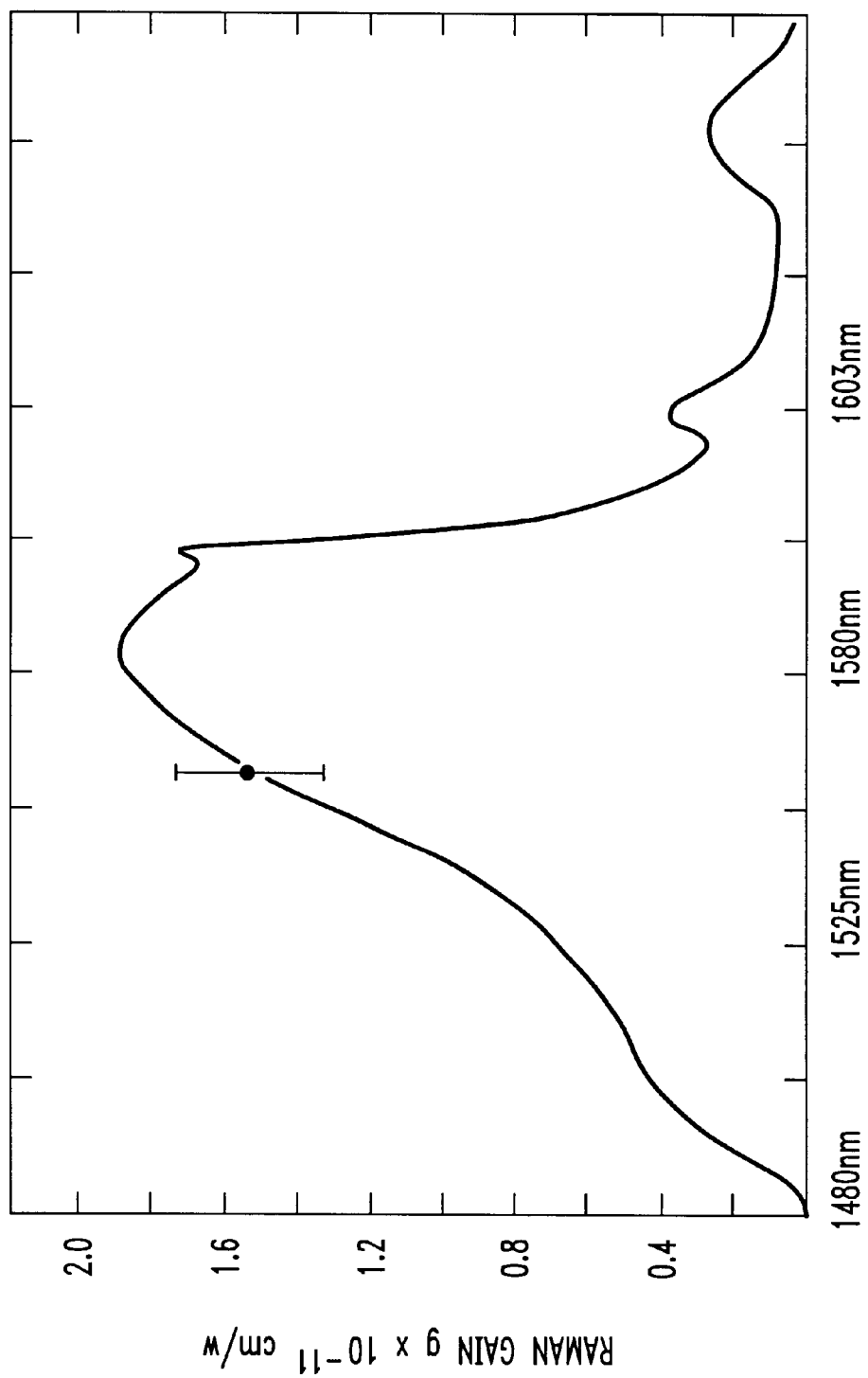
FIG. 5 shows the variation in Raman gain with wavelength separation from a 1480 nm pump wavelength.

With reference to FIG. 5, if the pump signal $\lambda$p is at 1480 nm, the maximum Raman gain is shown to peak at wavelengths of about 1580 nm, about 100 nm above the pump signal $\lambda$p. Note that Raman gain increases almost linearly up to the wavelength of 1580 nm. At signal wavelengths above 1580 nm, Raman gain starts to decrease. Thus, if a pump signal $\lambda$p of 1480 nm is used, and the system DWDM signal wavelengths are in the range 1500–1600 nm, then the DWDM signal wavelengths will be amplified by a maximum Raman gain of about 1.9 dB.

Figure 2E:
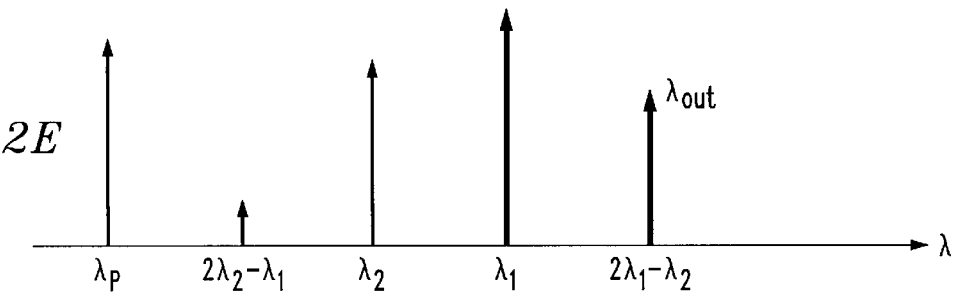

In accordance with another aspect of our invention as shown in FIG. 2(e), erbium gain can be used to further increase the levels of all of the wavelengths $2\lambda 2-\lambda 1$, $\lambda 2,\lambda 1$, and $2\lambda 1-\lambda 2$. By adding a low level erbium doping to optical fiber 102, an erbium doped fiber amplifier (EDFA) is formed to provide additional signal gain. The erbium doping is kept low so as to provide gain but yet not absorb too much of the wavelengths $\lambda 1$ and $\lambda 2$ which would decrease the power density of wavelengths $\lambda 1$ and $\lambda 2$ and hence reduce the level of four wave mixing in the fiber 102, as shown in equation (1).

After the power level of desired output wavelength $\lambda$out ($2\lambda 1-\lambda 2$ in our example) has been boosted by Raman gain alone or with additional erbium gain, filter 103 is used to filter out the wavelengths $2\lambda 2-\lambda 1$, $\lambda 2$, and $\lambda 1$ and output only the desired wavelength $\lambda$out (i.e., $2\lambda 1-\lambda 2$).

Note, that while we have shown and described the effects of Raman and Erbium gain on only the wavelength signal arrangement of FIG. 2(c), it should be understood that the above Raman and Erbium gain discussion applies equivalently to the wavelength signal arrangement of FIG. 2(b). Since in FIG. 2(b) the desired output $\lambda$out (i.e., $2\lambda 2-\lambda 1$) is close to the wavelength $\lambda 2$, the filter 103 needs a sharper response [than the filter 103 used for the FIG. 2 (c) example] to adequately filter out the wavelengths $2\lambda 1-\lambda 2$, $\lambda 1$, and $\lambda 2$.

Generating Shorter Wavelengths

Figure 3A:
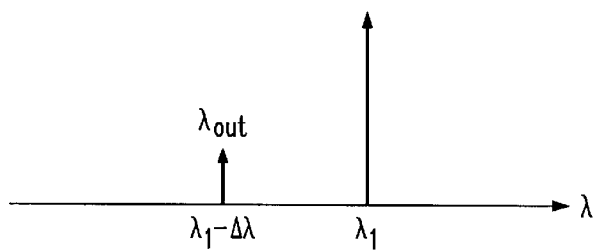
FIG. 3 shows, illustratively, (a) the optical wavelength $\lambda 1$ to be converted to a shorter wavelength $\lambda$out, (b) and (c) two ways to use four wave mixing for the conversion, (d) the effect of Raman gain on the optical signals of (c), and (e) the effect of erbium gain on the signals of (d)
Figure 3B:
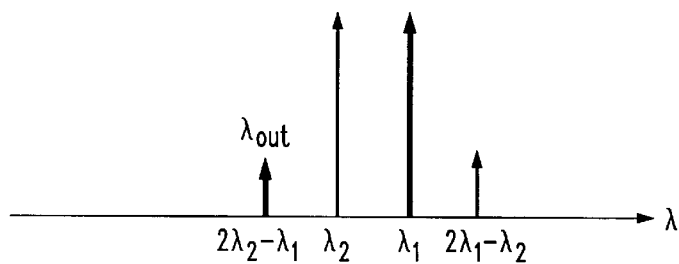

FIG. 3(a) shows, illustratively, the optical wavelength $\lambda 1$ (in bold) to be converted to a shorter wavelength $\lambda$out (in bold) having a wavelength equal to $\lambda 1-\Delta\lambda$. In FIG. 3(b), the optical wavelength $\lambda 1$ to be converted has a longer wavelength than the select or control wavelength $\lambda 2$. The desired out wavelength $\lambda$out would be the shorter four wave mixing wavelength $2\lambda 2-\lambda 1$. As shown in FIG. 3(b), the difference in wavelength between the signal wavelength $\lambda 1$ to be converted and the desired output wavelength $\lambda$out, i.e., $2\lambda 2-\lambda 1$, is determined by selecting the control wavelength $\lambda 2$ inputted to fiber 102.

Figure 3C:
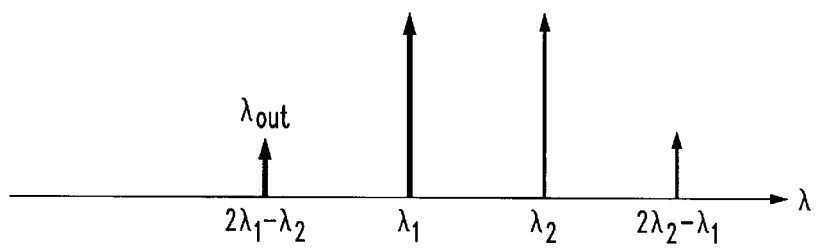

In FIG. 3(c), the optical wavelength $\lambda 1$ to be converted has a shorter wavelength than the control wavelength $\lambda 2$. In this example, the desired out wavelength $\lambda$out would be the shorter four wave mixing wavelength $2\lambda 1-\lambda 2$. As shown in FIG. 3(b), when $\lambda 1>\lambda 2$, the separation between the signal wavelength $\lambda 1$ and the control wavelength $\lambda 2$ is only one half of the wavelength shift, $\Delta\lambda/2$, needed to produce the output wavelength $\lambda$out ($2\lambda 1-\lambda 2$). When $\lambda 2>\lambda 1$, as shown in FIG. 3(c), the separation between the signal wavelength $\lambda 1$ and the control wavelength $\lambda 2$ is equal to the wavelength shift, $\Delta\lambda$, needed to produce the output wavelength $\lambda$out ($2\lambda 1-\lambda 2$).

As discussed, in FIG. 3(b) the smaller separation, $\Delta\lambda/2$, between the signal wavelength $\lambda 1$ and the control wavelength λ2 has the advantage of being less sensitive to the dispersion characteristics of the optical fiber 102. However, the smaller separation, Δλ/2, requires a sharper filter 103 to separate λout (i.e., 2λ2–λ1) from λ2. In comparison in FIG. 3(c), a larger separation, Δλ, between the signal wavelength λ1 and the control wavelength λ2 has the disadvantage of being more sensitive to the dispersion characteristics of the optical fiber 102, but relaxes the filter 103 requirements needed to separate λout (i.e., 2λ2–λ1) from λ1. Additionally in FIG. 3(b), a given change in control wavelength λ2 produces a larger change in the output wavelength λout than does the arrangement of FIG. 3(c).

Figure 3D:
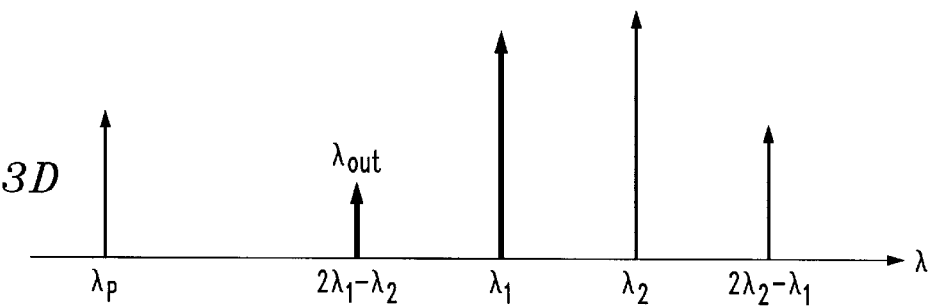

As previously discussed, Raman gain requires a shorter wavelength optical signal coupled to the optical fiber 102 to act as an energy source or pump to provide gain to the longer wavelengths. Since as shown in FIG. 3(c), both the signal wavelength λ1 and the control wavelength λ2 are longer than the desired output wavelength λout (e.g., 2λ1–λ2) another wavelength pump λp having a lower wavelength needs to be provided to produce Raman gain in fiber 102. With reference to FIG. 1, the wavelength pump λp signal is shown. The resulting Raman gain is shown in FIG. 3(d). Comparing FIG. 3(d) to FIG. 3(c), while the Raman gain has increased the amplitude of the wavelength signal 2λ1–λ2, the gain to wavelength signal 2λ1–λ2 is smaller relative to the gain experienced by the other longer wavelengths λ1, λ2, and 2λ2–λ1. This is because Raman gain is proportional to the separation between the pump wavelength and the wavelength of the signal being amplified up to about 100 nm (as shown in FIG. 5). Thus, if the power level of wavelengths λ1 and λ2 are equal in FIG. 3(c), then in FIG. 3(d) the power level of wavelength λ1 would be then be smaller than the power level of wavelength λ2. As previously noted, Raman gain favors the wavelength conversion of wavelength λ1 to the higher wavelength 2λ2–λ1, FIG. 2(d), rather than to the lower wavelength 2λ1–λ2 formed by the four wave mixing, FIG. 3(d).

Figure 3E:
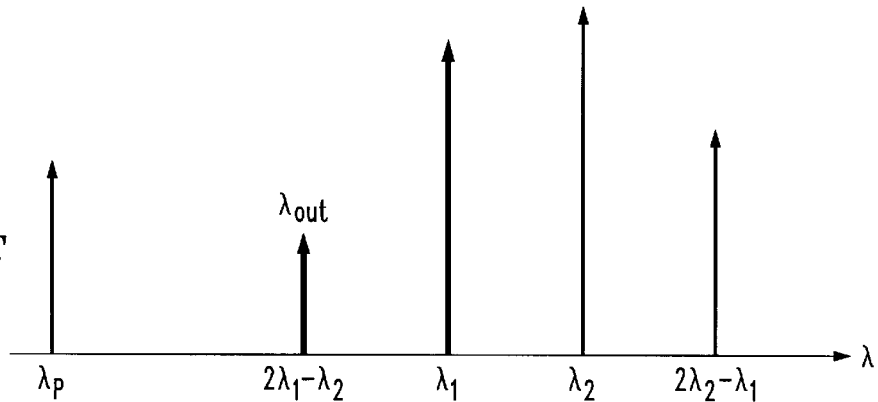

As shown in FIG. 3(e) erbium gain can be used to further increase the levels of all of the wavelengths 2λ1–λ2, λ1, λ2, and 2λ2–λ1. The erbium gain may be needed to ensure that the power level of the desired output λout (i.e., 2λ1–λ2) is sufficiently higher than the background optical signal noise level to provide a good optical signal-to-noise ratio. In a practical arrangement, the optical fiber may have an erbium doping density range of about 6–25 parts per million (ppm). The actual amount of erbium doping utilized is also a function of the input signal power density and the length of the optical fiber. The filter 103 is used to filter out the wavelengths λp, λ1, λ2, and 2λ2–λ1 and output only the desired wavelength λout (i.e., 2λ1–λ2).

Again, while we have shown and described the effects of Raman and Erbium gain on only the wavelength signal arrangement of FIG. 3(c), it should be understood that the Raman and Erbium gain discussion applies equivalently to the wavelength signal arrangement of FIG. 3(b). Since the output wavelength λout (i.e., 2λ1–λ2) is close to the wavelength λ1, the filter 103 needs a sharper response to adequately filter out the wavelengths λp, λ1, λ2, and 2λ2–1.

In the above description, while specific examples were described for the optical fiber length, effective four wave mixing and Raman gain requires a length of greater than 100 m and can extend to over 1000 m depending on the fiber characteristics. Similarly, the cross-section area of optical fiber is typically in the range 10–50 $\mu^2$. Typically, the pump wavelength λp for Raman gain is about 1480 nm, while typical ranges for wavelengths λ1 and λ2 is 1500–1600 nm. The optical fiber utilized may be a polarization maintaining optical fiber, a single mode fiber, or a multimode fiber.

Thus, what has been described is merely illustrative of the application of the principles of the present invention. Other methods and arrangements can be implemented by those skilled in the art without departing from the spirit and scope of the present invention.

What is claimed is:

1. An optical wavelength converter apparatus comprising
   a first input optical wavelength signal coupled to a first end of an optical fiber;
   a second input optical wavelength signal coupled to the first end of the optical fiber;
   the optical fiber having a length suitable to provide substantial Raman gain to optical wavelength signals produced by four wave mixing of the first input optical wavelength signal and the second input optical wavelength signal in the optical fiber, the Raman gain using a third input signal as a pump signal, the third input optical wavelength signal having a wavelength substantially below the four wave mixing optical wavelength signals produced in the optical fiber;
   wherein the power levels of the first and second optical wavelength signals are selected to produce a predetermined power density in the optical fiber; and
   an optical filter connected to a second end of the optical fiber for filtering all optical wavelengths except for the lower wavelength of the four wave mixing optical wavelength signals which is outputted from the filter.

2. The optical wavelength converter apparatus of claim 1 wherein
   the first input optical wavelength signal is converted to a desired wavelength signal;
   the second input optical wavelength signal controls the amount of wavelength shift applied to the first input optical wavelength signal during four wave mixing to produce the desired wavelength signal.

3. The optical wavelength converter apparatus of claim 1 wherein the first input optical wavelength signal has a higher wavelength than the second input optical wavelength signal.

4. The optical wavelength converter apparatus of claim 1 wherein the first input optical wavelength signal has a lower wavelength than the second input optical wavelength signal.

5. The optical wavelength converter apparatus of claim 1 further comprising
   an adjustable polarization control circuit for controlling the polarization of one of the first and second input optical wavelength signals being coupled to the optical fiber.

6. The optical wavelength converter apparatus of claim 1 wherein the power level of said lower wavelength four wave mixing optical wavelength signal is proportional to $$P_{2\lambda 1-\lambda 2} \propto \left(\frac{Leff}{Aeff}\right)^2 \times P_{\lambda 1}^2 \times P_{\lambda 2}$$

Where $P_{\lambda 1}$ is the input signal power of the wavelength λ1 to be converted, $P_{\lambda 2}$ is the input signal power of the control wavelength λ2, λ2>λ1, Leff is the effective length of the optical fiber, and Aeff is the effective cross-section area of the optical fiber.

7. The optical wavelength converter apparatus of claim 1 further comprising
   a coupler for coupling the first and second input optical wavelength signals to the optical fiber, the output of the coupler being interfaced to the optical fiber using a procedure selected from a group including splicing, tapered splicing, and GRIN lens.

8. The optical wavelength converter apparatus of claim 1 wherein the optical fiber is selected from a group including a polarization maintaining optical fiber, a single mode fiber, and a multimode fiber.

9. An optical wavelength converter apparatus comprising
a first input optical wavelength signal coupled to a first end of an optical fiber;
a second input optical wavelength signal coupled to the first end of the optical fiber;
the optical fiber having a length suitable to provide substantial Raman gain to optical wavelength signals produced by four wave mixing of the first input optical wavelength signal and the second input optical wavelength signal in the optical fiber, the Raman gain using at least one pump signal selected from a group including the first input optical wavelength signal, the second input optical wavelength signal, and a third input optical wavelength signal having a wavelength substantially below the four wave mixing optical wavelength signals produced in the optical fiber;
wherein the power levels of the first and second optical wavelength signals are selected to produce a predetermined power density in the optical fiber;
an optical filter connected to a second end of the optical fiber for filtering all optical wavelengths except for one of the four wave mixing optical wavelength signals, and
wherein the optical fiber is erbium doped at a level which enables the optical fiber to be an erbium doped fiber amplifier (EDFA) and wherein the third input wavelength is used as a pump wavelength for the EDFA.

10. The optical wavelength converter apparatus of claim 9 wherein the erbium doping density range is 6–25 ppm.

11. An optical wavelength converter apparatus comprising
a first input optical wavelength signal coupled to a first end of an optical fiber;
a second input optical wavelength signal coupled to the first end of the optical fiber;
a third input optical wavelength signal coupled to the first end of the optical fiber
the optical fiber having a length suitable to provide substantial Raman gain to a lower four wave mixing optical wavelength signal produced in the optical fiber, the Raman gain using the third input optical wavelength signal having a wavelength substantially below the lower four wave mixing optical wavelength signal produced in the optical fiber;
wherein the power levels of the first and second optical wavelength signals are selected to produce a predetermined power density in the optical fiber; and
an optical filter connected to a second end of the optical fiber for filtering all optical wavelengths except for the lower four wave mixing optical wavelength signal.

12. A method of converting an optical wavelength to another wavelength comprising the steps of
receiving a first input optical wavelength signal to be converted;
receiving a second input optical wavelength signal;
coupling the first and second input optical wavelength signals to a first end of an optical fiber;
selecting the optical fiber to have a length suitable to provide substantial Raman gain optical wavelength signals produced by four wave mixing of the first input optical wavelength signal and the second input optical wavelength signal in the optical fiber;
pumping the Raman gain using a third input optical wavelength signal having a wavelength substantially below the four wave mixing optical wavelength signals produced in the optical fiber;
selecting the power level of the first and second input optical wavelength signals to produce a predetermined power density in the optical fiber; and
filtering all optical wavelengths exiting from a second end of the optical fiber except for one of the four wave mixing optical wavelength signals.

* * * * *